Patented Aug. 7, 1923.

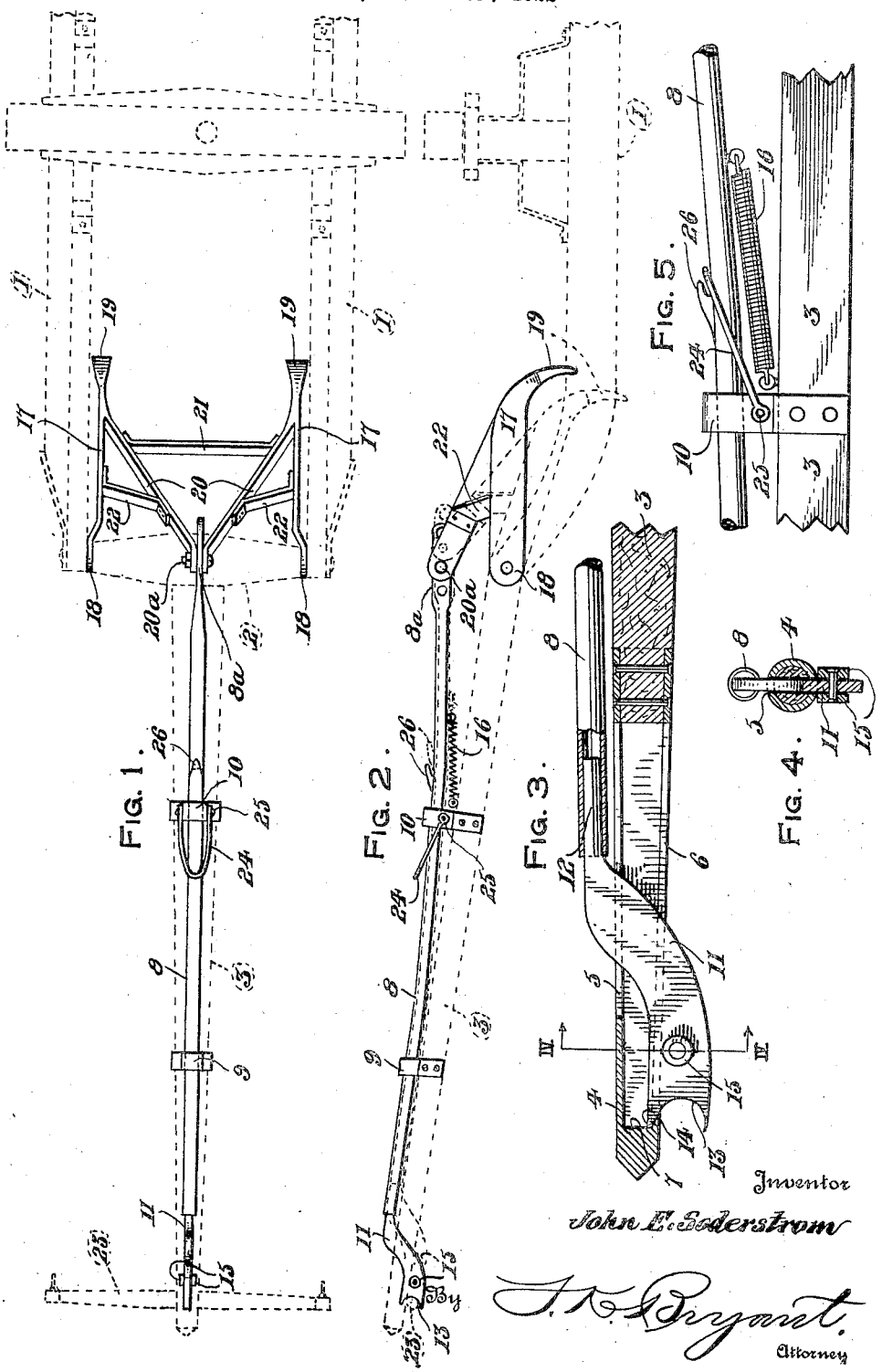

1,464,372

UNITED STATES PATENT OFFICE.

JOHN E. SODERSTROM, OF STOCKHOLM, MAINE.

SLED BRAKE.

Application filed April 18, 1922. Serial No. 554,689.

*To all whom it may concern:*

Be it known that I, JOHN E. SODERSTROM, a citizen of the United States of America, residing at Stockholm, in the county of Aroostook and State of Maine, have invented certain new and useful Improvements in Sled Brakes, of which the following is a specification.

This invention relates to certain new and useful improvements in sled brakes especially adapted for use in connection with horse drawn sleds wherein the brake shoes are automatically operated to position the same for engagement with the ground when the horses are forced to hold back the weight of the sled.

The invention further embodies in a sled brake of the type above described, means for rendering the same inoperative when desired.

Another object of the invention resides in the provision of a sled brake having a longitudinally slidable resiliently mounted rod positioned upon the bar or tongue of the sled and ground engaging brake shoes pivotally associated with the rear end of the rod, the cross bar of the harness hames engaging the forward end of the rod to shift the same rearwardly against the tension thereon for applying the brake shoe.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a top plan view of a sled brake constructed in accordance with the present invention, the same being shown in connection with a horse-drawn sled illustrated by dotted lines.

Figure 2 is a side elevational view of the device showing the pivotal mounting of the brake shoes and the tensioned operating rod for the shoe.

Figure 3 is an enlarged fragmentary detail sectional view of the forward end of the sled tongue and the operating rod for the brake shoes.

Figure 4 is a detail sectional view taken on line IV—IV of Figure 3 showing the slotted forward end of the tongue and the operating rod slidably mounted therein, and Figure 5 is a fragmentary side elevational view of a portion of the sled tongue and operating rod, showing the resilient mounting of the tongue and the latch device for holding the operating rod in an inoperative position.

Referring more in detail to the accompanying drawing, there is illustrated a brake associated with a sled embodying side runners 1 between the forward ends of which the cross bar 2 is journaled, the cross bar carrying a tongue 3.

The sled brake embodies pivotally mounted shoes and a tensioned operating rod therefor associated with the tongue 3, the forward end of the tongue being especially constructed to accommodate the mounting of the operating rod shown in Figure 3. The forward end of the tongue 3 has secured thereto an elongated tubular cap 4 having registering slots 5 and 6 in the upper and lower sides respectively, the forward edge of the lower slot 6 terminating forwardly of the corresponding edge of the upper slot and adjacent the abutment wall 7 of the extreme forward end of the cap 4.

The operating rod 8 for the brake shoes is of tubular formation and is slidably associated with the tongue 3, guide straps 9 and 10 being carried by the tongue and through which the rod 8 is slidably mounted. A head is associated with the forward end of the operating rod 8 and embodies a reversely curved blade portion 11 carrying a cylindrical stem 12 upon the rear end thereof that is secured in the adjacent end of the rod 8, the blade 11 extending through the slots 5 and 6 in the tongue cap 4, from the upper to the lower sides thereof, while the extreme forward end of the blade 11 is grooved as at 13 having a shoulder 14 that engages the abutment wall 7 of the forward closed end of the slot. To reduce friction between the blade 11 of the rod head and the cap 4 of the tongue, that portion of the blade disposed at the lower side of the cap is provided with a pair of rollers 15 that engage the lower side of the tongue cap as clearly shown in Figures 3 and 4.

To maintain the operating rod 8 at its limit of forward movement, with the shoulder 14 of the blade 11 engaging the abutment wall 7 of the cap, the coil spring 15 is secured at one end thereof to the tongue 3 adjacent the guide strap 10, the other end of the spring being secured to the operating rod rearwardly of said strap, this spring mounting being clearly shown in Figure 5.

The brake shoes are pivotally associated with the rear end of the operating rod 8 and the pivoted cross bar 2 of the tongue, the brake shoe embodying a pair of side arms 17 pivotally connected as at 18 upon the bearings supporting the cross bar 2, and carrying upon the opposite ends thereof ground engaging feet 19 as clearly shown in Figures 1 and 2. The side arms 17 carry integral angle brace bars 20, further braced by a cross bar 21 and angle braces 22 with the adjacent free ends of the brace member 20 pivotally connected as at 20ª to the rear end 8ª of the operating rod 8, the rod 8 being flattened at its rear end and provided with a plurality of spaced openings to provide for an adjustable mounting of the brake shoes relative to the operating rod.

The invention is illustrated in connection with a single tongue double-horse sled having the hames bar 23 connected to the hames or collars of the harness. When the sled is being drawn forwardly during the usual operation thereof, the spring 16 will shift the operating rod 8 at its limit of forward movement, elevating the brake shoes 19 to the position shown in Figure 2, with the shoulder 14 upon the head blade 11 engaging the abutment wall 7 of the tongue cap. When it is desired to place the brake shoes 19 into engagement with the ground to retard the forward movement of the sled, the driving reins of the harness are tightened, causing greater movement of the sled than the horses drawing the same and causing the hame bar 23 positioned in the grooved end 13 of the head blade 11 to engage the blade and shift the same rearwardly, moving the operating rod rearwardly against the tension of the spring 16 and causing a pivotal movement of the side arms 17 of the brake shoes to lower the same to the dotted line position shown in Figure 2, thereby placing the brake shoes 19 into engagement with the ground. The application of the brake shoes 19 is entirely automatic in operation, and will effectively retard the forward movement of the sled and ultimately bring the same to a complete stop. Should it be desired to operate the sled in the absence of the brake shoes, and to hold the latter inoperatively positioned, the looped strap 24 pivoted to the guide strap 10 as at 25 may be swung from the position shown in Figure 2, to the position shown in Figure 5 for engagement with the hook 26 carried by the operating rod 8 to hold the rod against rearward sliding movement as will be clearly evident from an inspection of Figure 5.

From the above detailed description of the construction and operation of the device, it is believed that the same will be fully understood, it being understood that minor changes are contemplated in details of construction that will fall within the scope of the invention as claimed.

Having thus described the invention, what I claim as new is:—

1. In a sled brake of the type described, the combination with a sled frame and tongue, of a resiliently mounted rod slidably associated with the tongue, brake shoes pivotally connected to the rear end of the rod, the forward end of the tongue having a vertical slot therein, a head carried by the forward end of the rod having a reversely curved blade portion extending through the tongue and the forward end of the blade disposed beneath the tongue, and anti-friction rollers carried by said blade engaging the lower side of the tongue, a hook carried by said rod and hinged strap carried by said tongue adapted to engage said hook to hold the rod rigidly positioned relative to the tongue.

2. In a sled brake of the type described, the combination with a sled frame and tongue, of a resiliently mounted rod slidably associated with the tongue, brake shoes pivotally connected to the rear end of the rod, a tubular cap having a vertical slot forming the forward end of the tongue, and a head carried by the forward end of the rod having a reversely curved blade portion extending through the slot in said cap with the forward end of the blade disposed therebeneath.

3. In a sled brake of the type described, the combination with a sled frame and a tongue pivotally attached thereto, of a brake shoe pivotally associated with the connection between said frame and tongue, a resiliently mounted rod slidably associated with said tongue and adjustably connected to the central portion of said brake shoe, the forward end of the tongue having a vertical slot therein, and a head carried by the forward end of the rod having a reversely curved blade portion extending through the tongue and the forward end of the blade disposed beneath said tongue.

4. In a sled brake of the type described, the combination with a sled frame and a tongue pivotally attached thereto, of a brake shoe pivotally associated with the connection between said frame and tongue, a resiliently mounted rod slidably associated with said tongue and adjustably connected to the central portion of said brake shoe, the forward end of the tongue having a vertical slot therein, a head carried by the forward end of the rod having a reversely curved blade portion extending through the tongue and the forward end of the blade disposed beneath the tongue, said brake shoe comprising side arms pivotally connected at their upper ends to the frame and tongue connection, ground engaging feet formed on the lower ends of said arms, and angle brace arms integrally formed with said side arms connected at their upper ends to the resiliently mounted rod.

5. In a sled brake of the type described, the combination with a sled frame and tongue, of a resiliently mounted tubular rod slidably associated with the tongue, said tongue having a vertical slot, ground engaging elements pivotally connected to the forward end of said sled frame, angularly arranged arms extending inwardly from said elements connected at their free ends to said rod, and a head having a reversely curved blade portion extending through the tongue slot and a cylindrical stem section inserted in the forward end of said rod.

In testimony whereof I affix my signature.

JOHN E. SODERSTROM.